US008495180B2

(12) United States Patent
Karaoguz et al.

(10) Patent No.: US 8,495,180 B2
(45) Date of Patent: Jul. 23, 2013

(54) SERVER ARCHITECTURE SUPPORTING A PERSONAL MEDIA EXCHANGE NETWORK

(75) Inventors: Jeyhan Karaoguz, Irvine, CA (US); James Bennett, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 2635 days.

(21) Appl. No.: 10/675,443

(22) Filed: Sep. 30, 2003

(65) Prior Publication Data
US 2004/0117834 A1    Jun. 17, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003.

(51) Int. Cl.
*G06F 15/173* (2006.01)
*G06F 15/16* (2006.01)

(52) U.S. Cl.
USPC ............ 709/220; 709/218; 709/226; 709/237

(58) Field of Classification Search
USPC ................. 709/218, 220, 225–229, 231, 237, 709/249; 725/60, 64, 91, 100, 103, 110, 111, 725/114; 726/30; 713/156, 175; 370/389, 370/392, 395.2, 395.3, 401
See application file for complete search history.

(56) References Cited

U.S. PATENT DOCUMENTS

| | | | | | |
|---|---|---|---|---|---|
| 5,841,990 | A | * | 11/1998 | Picazo et al. | 709/249 |
| 5,896,382 | A | * | 4/1999 | Davis et al. | 370/401 |
| 5,926,478 | A | * | 7/1999 | Ghaibeh et al. | 370/395.51 |
| 5,974,453 | A | * | 10/1999 | Andersen et al. | 709/220 |

(Continued)

FOREIGN PATENT DOCUMENTS

| WO | WO-01/31472 A | 5/2001 |
|---|---|---|
| WO | 01/71983 | 9/2001 |

OTHER PUBLICATIONS

Moh M et al, "Mobile IP Telephony: Mobility Support of SIP", Computer Communications and Networks, 1999, Proceedings, Eigth International Conference in Boston, MA, USA, Oct. 11-13, 1999, Piscataway, NJ, USA, IEEE, Oct. 11, 1999, pp. 554-559, XP010359588 ISBN: 0-7803-5794-9.

(Continued)

*Primary Examiner* — Melvin H Pollack
(74) *Attorney, Agent, or Firm* — Garlick & Markison; Bruce E. Garlick

(57) ABSTRACT

Certain aspects of the invention may be found in a method and system for setting up devices for communication on a communication network and may include a headend that may detect when a first device is initially coupled to the communication network and assign an address to the first device. The headend may transfer the assigned address to the first device and in response to receiving the transferred assigned address and/or an identifier of the first device from the first device, the headend may communicate the transferred received assigned address and/or the identifier of the first device to at least one communication server coupled to the communication network. The assigned address of the first device may be a static address, a dynamic address and/or an embedded device address such as a MAC address. The identifier of the first device may be a digital certificate and/or a serial number.

30 Claims, 15 Drawing Sheets

U.S. PATENT DOCUMENTS

| | | | | |
|---|---|---|---|---|
| 6,141,688 | A * | 10/2000 | Bi et al. | 709/227 |
| 6,249,523 | B1 * | 6/2001 | Hrastar et al. | 370/401 |
| 6,272,129 | B1 * | 8/2001 | Dynarski et al. | 370/356 |
| 6,563,816 | B1 * | 5/2003 | Nodoushani et al. | 370/352 |
| 6,591,306 | B1 * | 7/2003 | Redlich | 709/245 |
| 6,636,499 | B1 * | 10/2003 | Dowling | 370/338 |
| 6,654,796 | B1 * | 11/2003 | Slater et al. | 709/220 |
| 6,665,020 | B1 * | 12/2003 | Stahl et al. | 348/552 |
| 6,686,838 | B1 * | 2/2004 | Rezvani et al. | 340/506 |
| 6,728,239 | B1 * | 4/2004 | Kung et al. | 370/352 |
| 6,735,619 | B1 * | 5/2004 | Sawada | 709/212 |
| 6,760,762 | B2 * | 7/2004 | Pezzutti | 709/223 |
| 6,763,454 | B2 * | 7/2004 | Wilson et al. | 713/1 |
| 6,774,926 | B1 | 8/2004 | Ellis et al. | |
| 6,823,454 | B1 * | 11/2004 | Hind et al. | 713/168 |
| 6,857,009 | B1 * | 2/2005 | Ferreria et al. | 709/219 |
| 6,901,439 | B1 * | 5/2005 | Bonasia et al. | 709/220 |
| 6,934,754 | B2 * | 8/2005 | West et al. | 709/225 |
| 6,941,356 | B2 * | 9/2005 | Meyerson | 709/220 |
| 6,950,875 | B1 * | 9/2005 | Slaughter et al. | 709/230 |
| 6,965,581 | B2 * | 11/2005 | Nguyen et al. | 370/316 |
| 6,982,953 | B1 * | 1/2006 | Swales | 370/218 |
| 6,996,628 | B2 * | 2/2006 | Keane et al. | 709/238 |
| 7,010,303 | B2 * | 3/2006 | Lewis et al. | 455/445 |
| 7,020,694 | B2 * | 3/2006 | Saito et al. | 709/220 |
| 7,035,271 | B1 * | 4/2006 | Peterson | 370/352 |
| 7,039,391 | B2 * | 5/2006 | Rezvani et al. | 455/411 |
| 7,069,312 | B2 * | 6/2006 | Kostic et al. | 709/220 |
| 7,079,527 | B2 * | 7/2006 | Owens | 370/352 |
| 7,114,070 | B1 * | 9/2006 | Willming et al. | 713/156 |
| 7,130,895 | B2 * | 10/2006 | Zintel et al. | 709/220 |
| 7,165,109 | B2 * | 1/2007 | Chiloyan et al. | 709/227 |
| 7,197,550 | B2 * | 3/2007 | Cheline et al. | 709/223 |
| 7,213,061 | B1 * | 5/2007 | Hite et al | 709/223 |
| 7,243,132 | B2 * | 7/2007 | Choi | 709/208 |
| 7,243,141 | B2 * | 7/2007 | Harris | 709/220 |
| 7,272,137 | B2 * | 9/2007 | Unitt et al. | 370/389 |
| 7,280,546 | B1 * | 10/2007 | Sharma et al. | 370/401 |
| 7,296,283 | B2 * | 11/2007 | Hrastar et al. | 725/30 |
| 7,299,304 | B2 * | 11/2007 | Saint-Hilaire et al. | 710/11 |
| 7,299,488 | B2 * | 11/2007 | Brodigan et al. | 725/119 |
| 7,302,487 | B2 * | 11/2007 | Ylonen et al. | 709/229 |
| 7,308,575 | B2 * | 12/2007 | Basil et al. | 713/168 |
| 7,313,384 | B1 * | 12/2007 | Meenan et al. | 455/410 |
| 7,313,606 | B2 * | 12/2007 | Donahue et al. | 709/220 |
| 7,316,022 | B2 * | 1/2008 | Nishio | 719/321 |
| 7,328,266 | B2 * | 2/2008 | Schmidt et al. | 709/227 |
| 7,349,967 | B2 * | 3/2008 | Wang | 709/227 |
| 7,370,091 | B1 * | 5/2008 | Slaughter et al. | 709/220 |
| 2001/0004768 | A1 * | 6/2001 | Hodge et al. | 725/91 |
| 2001/0030785 | A1 * | 10/2001 | Pangrac et al. | 359/125 |
| 2002/0016971 | A1 | 2/2002 | Berezowski et al. | |
| 2002/0042924 | A1 * | 4/2002 | Adams | 725/114 |
| 2002/0078161 | A1 * | 6/2002 | Cheng | 709/208 |
| 2002/0104093 | A1 * | 8/2002 | Buehl et al. | 725/98 |
| 2002/0116464 | A1 | 8/2002 | Mak | |
| 2002/0152311 | A1 * | 10/2002 | Veltman et al. | 709/227 |
| 2003/0056008 | A1 * | 3/2003 | Russell et al. | 709/245 |
| 2003/0061315 | A1 * | 3/2003 | Jin | 709/220 |
| 2003/0079124 | A1 * | 4/2003 | Serebrennikov | 713/156 |
| 2003/0081619 | A1 * | 5/2003 | Phillips et al. | 370/400 |
| 2003/0084173 | A1 * | 5/2003 | Deleu et al. | 709/229 |
| 2003/0154285 | A1 * | 8/2003 | Berglund et al. | 709/227 |
| 2003/0225864 | A1 * | 12/2003 | Gardiner et al. | 709/220 |
| 2004/0003051 | A1 | 1/2004 | Krzyzanowski et al. | |
| 2004/0045035 | A1 * | 3/2004 | Cummings et al. | 725/114 |
| 2005/0028208 | A1 | 2/2005 | Ellis et al. | |

OTHER PUBLICATIONS

Schulzrine H et al, "Application-Layer Mobility Using SIP", Service Portability and Virtual Customer Environments, 2000 IEEE San Francisco, CA, USA, Dec. 1, 2000, Piscataway, NJ, USA, IEEE, pp. 29-36, XP010551460 ISBN: 0-7803-7133-X.

Communication pursuant to Article 94(3) EPC for European Patent Application No. 04 001 227.0-2413, dated Dec. 11, 2009.

* cited by examiner

| CHANNELS | << 1PM | 2PM | ... | 6PM | 7PM >> |
|---|---|---|---|---|---|
| Family Vacations | | | | | |
| Kids sports | | | | | |
| ... | | | | | |
| Vacation in Alaska Video  802 | Normal Estimated Delivery Time: 2 Hrs 13 mins Cost: $0.59 (Without Queuing) | | Showing All day (48 mins) Earliest Order Time: 4:00 PM MPEG-2, 1.5 Mbps | | |
| Vacation in Alaska Video  803 | Express Estimated Delivery Time: 18 mins Cost: $1.20 (With Queuing) | | Showing All day (48 mins) Earliest Order Time: 4:00 PM MPEG-2, 4 Mbps | | |
| Vacation in Alaska Video  804 | Overnight Delivery: available Next Morning Cost: $0.05 (Server Stored) | | Showing All day (48 mins) Earliest Order Time: 4:00 PM MPEG-2, 19 Mbps | | |

Fig. 8

SERVER ARCHITECTURE SUPPORTING A PERSONAL MEDIA EXCHANGE NETWORK

CROSS-REFERENCE TO RELATED APPLICATIONS/INCORPORATION BY REFERENCE

This application makes reference to, claims priority to, and claims the benefit of:
U.S. Provisional Application Ser. No. 60/432,472 filed Dec. 11, 2002;
U.S. Provisional Application Ser. No. 60/443,894 filed Jan. 30, 2003; and
U.S. Provisional Application Ser. No. 60/457,179 filed Mar. 25, 2003.

This application also makes reference to:
U.S. application Ser. No. 10/657,390 filed Sep. 8, 2003, issued as U.S. Pat. No. 7,496,647 on Feb. 24, 2009; and
U.S. application Ser. No. 10/660,267 filed Sep. 11, 2003, issued as U.S. Pat. No. 7,496,665 on Feb. 24, 2009.

Each of the above stated applications is incorporated herein by reference in its entirety.

FIELD OF THE INVENTION

Certain embodiments of the invention relate to providing communication in a media exchange architecture. In particular, certain embodiments of the invention relate to providing server architectures for the registering devices and the exchange of media, data, and services between devices on a media exchange network.

BACKGROUND OF THE INVENTION

Current communication systems allow digital media to be shared between users and entities on a communication network. Although current communication systems allow digital media to be shared among users and entities on a communication network, current sharing methodologies are somewhat limiting. Current communication systems provide two primary ways that allow users to exchange digital media. A first methodology utilizes fairly interactive method by permitting a personal computer (PC) having an upstream and downstream connection to, for example, the Internet, an intranet and a local are network (LAN).

An Internet service provider ISP) may provide or issue a temporary Internet protocol (IP) address to personal computers connected to the Internet using, for example, dynamic host configuration protocol (DHCP). Some computers may also be provided with a static IP address. The personal computers may then access web sites on the Internet using a web browser and send and receive email with or without file attachments in order to exchange media, data, and services between the personal computes. Files may also be transferred over the Internet using various protocols such as file transfer protocol (FTP) and hypertext transfer protocol. File transfer protocol (FTP) allows personal computers connected to the Internet to exchange files, independently of the personal computer hardware platform. Hypertext transfer protocol allows personal computers to upload and download information between a web server hosting a web site and a personal computer.

A user of a personal computer may connect a digital media device or a media peripheral device such as a digital camera or a MP3 player to a personal computer and download or upload digital files from the digital media device to the personal computer. A media peripheral device may interface to a personal computer through a USB (Universal Serial Bus) interface in order to exchange digital media between a personal computer and the media peripheral device. Again, the digital files may be attached to emails and shared with others in such a manner.

A user may have access to digital broadcast media through a set-top-box (STB) providing predominantly one-way communication. One-way communication is particularly true in satellite-based applications and broadcast television communication systems. In this regard, broadcast media may be sent from a broadcast media provider to the set-top-box. A user of a set-top-box may also be able to order media content such as movies through specialized broadcast channels such as pay-per-view (PPV) broadcast channels via the set-top-box. However, interaction between the user and the set-top-box is, otherwise, very limited. A set-top-box may interface to a cable infrastructure, a satellite and/or digital subscriber line (DSL) infrastructure to receive and/or transmit broadcast media and to exchange access information between the infrastructure and the set-top-box.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for setting up devices for communication on a communication network. Aspects of the method for setting up devices for communication on the communication network may comprise assigning an address to a first device coupled to the communication network and transferring the assigned address to the first device. In response to receiving the transferred assigned address and/or an identifier of the first device from the first device, the received transferred assigned address and/or the identifier of the first device may be communicated to at least one communication server coupled to the communication network. The method may further comprise detecting when the first device is initially coupled to the communication network prior to assigning the address to the first device. The assigned address of the first device may be a static address, a dynamic address and/or an embedded device address such as a media access control (MAC) address. The identifier of the first device may be a digital certificate and/or a serial number. The steps of assigning, transferring, communicating and/or detecting the first device may be achieved by a headend, which may be coupled to the communication network and provides access to the communication network for the first device.

The communication server may register the transferred assigned address and/or the identifier of the first device and broadcast the assigned address and/or the identifier throughout at least a portion of the communication network. The broadcasted transferred assigned address and/or the identifier of the first device may be received by a second device which may be located in at least a portion of the communication network that receives the broadcast. The second device may communicate with the first device by utilizing the received transferred assigned address and/or the identifier of the first device that is broadcasted. The transferred assigned address and/or the identifier of the first device may be received from the server by a second device whenever the second device desires to communicate with the first device via the communication network. In response to the request, the second device may receive the transferred assigned address and/or the identifier of the first device from the server. Accordingly, the second device may transfer media between the second device and the first device utilizing the received assigned address and/or the identifier of the first device. In another aspect of the invention, the transferred assigned address and/or the identifier of the first device may be requested from the server by the second device whenever the second device desires to communicate with the first device via the communication network based on a known location of the first device.

Another embodiment of the invention may provide a machine-readable storage, having stored thereon, a computer program having at least one code section for setting up devices for communication on a communication network. The at least one code section may be executable by a machine, thereby causing the machine to perform the steps as described above for setting up devices for communication on a communication network.

Certain embodiments of the system for setting up devices for communication on a communication network may comprise a headend that assigns an address to a first device coupled to the communication network. The headend may be adapted to transfer the assigned address to the first device. In response to receiving the transferred assigned address and/or an identifier of the first device from the first device, the headend may communicate the transferred received assigned address and/or the identifier of the first device to at least one communication server coupled to the communication network. The headend may also be adapted to detect when the first device is initially coupled to the communication network prior to assigning the address to the first device. The assigned address of the first device may be a static address, a dynamic address and/or an embedded device address such as a MAC address. The identifier of the first device may be a digital certificate and/or a serial number.

The communication server may register the transferred assigned address and/or the identifier of the first device and may broadcast the transferred assigned address and/or the identifier of the first device throughout at least a portion of the communication network. The system may further comprise a second device located in the at least a portion of the communication network that may receive the broadcasted transferred assigned address and/or the identifier of the first device. The second device may communicate with the first device utilizing the received broadcasted transferred assigned address and/or the identifier of the first device. The second device may requests the transferred assigned address and/or the identifier of the first device from the server whenever the second device desires to communicate with the first device via the communication network. In response to the request, the second device may receive the transferred assigned address and/or the identifier of the first device from the server and accordingly transfer media between the second device and the first device utilizing the received a transferred assigned address and/or the identifier of the first device. In another aspect of the invention, the second device may requests the transferred assigned address and/or the identifier of the first device from the server whenever the second device desires to communicate with the first device via the communication network based on a known location of the first device.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Certain aspects of the invention may be found in a method and system for setting up devices for communication on a communication network. In accordance with an embodiment of the invention, the method may comprise detecting when a first device is initially coupled to the communication network and assigning an address to the first device when it is coupled to the communication network. The assigned address may then be transferred to the first device. In response to receiving the transferred assigned address and/or an identifier of the first device from the first device, the received transferred assigned address and/or the identifier of the first device may be communicated to at least one communication server coupled to the communication network.

Figure 1A:
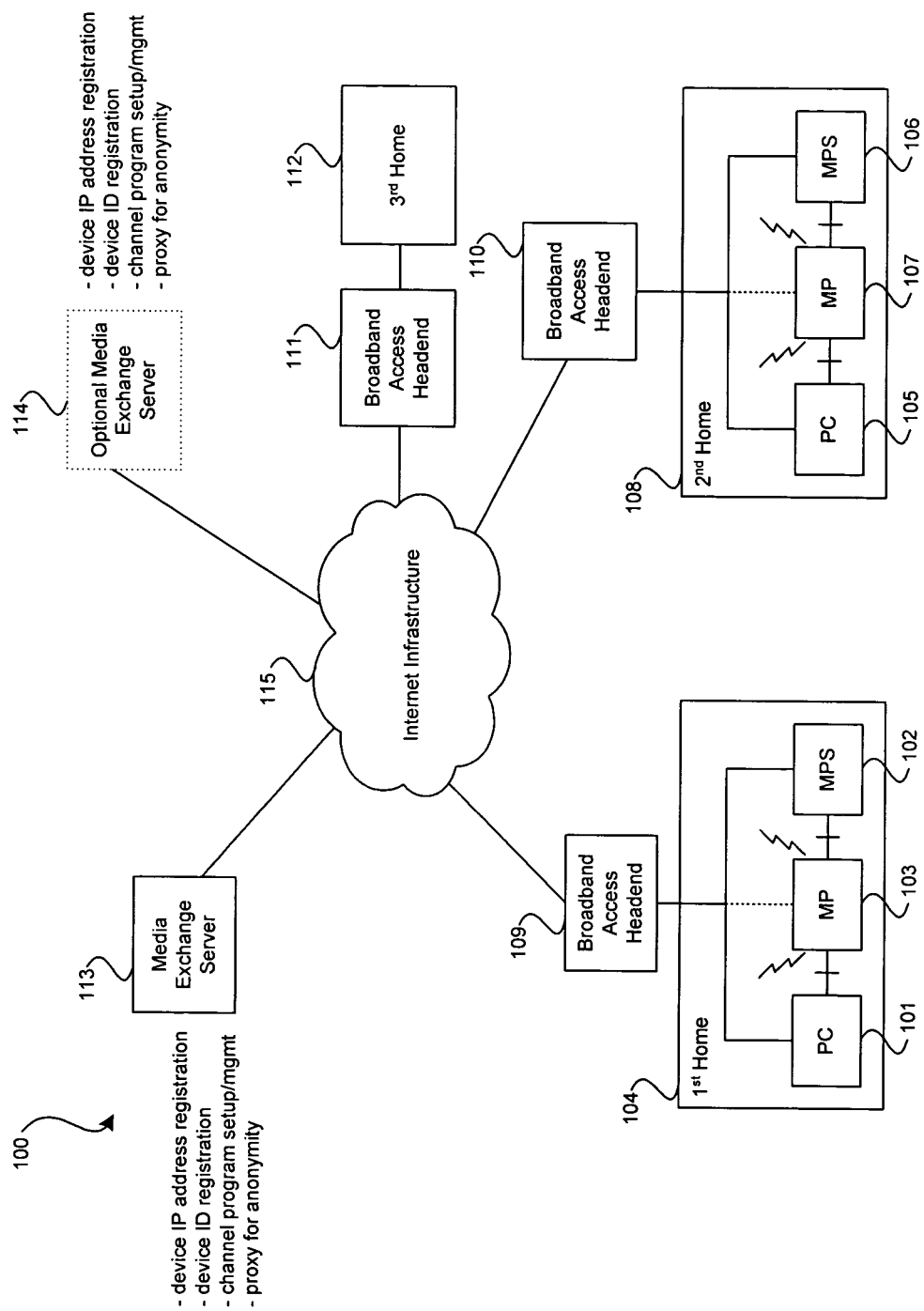
FIG. 1A is a diagram illustrating an embodiment of a media exchange network comprising a server architecture to support the registration of devices on the media exchange network, in accordance with various aspects of the present invention.

FIG. 1A is a diagram illustrating an embodiment of a media exchange network 100 comprising a server architecture to support the registration of devices on the media exchange network 100, in accordance with various aspects of the present invention. Referring to FIG. 1A, the media exchange network 100 is a communication network that may comprise a personal computer 101, a media processing system (MPS) 102, and at least one media peripheral (MP) 103 at a first ($1^{st}$) home 104; a personal computer 105, a media processing system 106, and at least one media peripheral 107 at a second ($2^{nd}$) home 108. The media exchange network 100 may be a communication network that may be utilized to facilitate communication or exchange of media. The media exchange server architecture solves the problem of communication between a device such as a media processing system, a personal computer and a media peripheral at a first home and another device such as a media processing system, a personal computer and a media peripheral at a second home or office over the media exchange network 100.

At the first location 104, the media peripheral 103 may interface with the personal computer 101 and/or the media processing system 102 via, for example, a wireless link or a wired link such as a universal serial bus (USB) or an IEEE 1394 Firewire connection. The personal computer 101 and the media processing system 102 may interface to a broadband access headend 109. The broadband access headend 109 may comprise a cable headend, a satellite headend, or a digital subscriber line (DSL) headend, in accordance with various embodiments of the invention. Optionally, the media peripheral 103 may interface with the broadband access headend 109. The personal computer 101, media processing system 102, and/or media peripheral 103 may include internal modems, for example, a cable modem or DSL modem or other interface devices in order to communicate with the broadband access headend 109. Optionally, the interface device such as a modem may be external to the personal computer 101, media processing system 102, and media peripheral 103.

The media peripheral 107 may interface to the personal computer 105 and/or the media processing system 106 via, for example, a wireless link or a wired link such as a universal serial bus (USB) or an IEEE 1394 Firewire connection. The personal computer 105 and the media processing system 106 may interface to a broadband access headend 110. The broadband access headend 110 may comprise a cable headend, a satellite headend, or a DSL headend. Optionally, the media processing system 107 may interface with the broadband access headend 110. The personal computer 105, media processing system 106, and/or media peripheral 107 may include internal modems, for example, a cable modem or DSL modem, or other interface device in order to facilitate communication with the broadband access headend 110. However, the invention is not limited in this regard and the interface device such as the modem may be externally coupled to the personal computer 105, media processing system 106, and media peripheral 107.

The media exchange network 100 may further comprise a broadband access headend 111, which may be adapted to couple a third ($3^{rd}$) home 112 to the Internet infrastructure 115. A media exchange server 113 may provide support for the media exchange network 100. In a case where a single server may be coupled to the Internet infrastructure 115 and provides support for the media exchange network or communication network 100, this may be referred to as a single server architecture. Accordingly, an embodiment of the invention may comprise more than two media exchange servers strategically located at various points in the media exchange network 100. The media exchange servers 113 and 114 may be configured to provide functionality on the media exchange network 100 including device registration, channel/program setup and management, and security.

The broadband access headends 109, 110 may interface to the Internet infrastructure 115. The broadband access headend 111 may comprise a cable headend, a satellite headend, or a DSL headend, for example. The third ($3^{rd}$) home 112 may also comprise one or more personal computers, media processing systems, and/or media peripherals.

In accordance with an alternative embodiment of the invention, a broadband access headend may be upgraded to a media exchange headend by adding functionality to facilitate the exchange of media on the media exchange network in conjunction with the media exchange server. Such functionality may include distributed networking capability, archival functionality such as long term media storage, temporary storage that may aid in the distribution and routing of media, storage management, and digital rights management.

The media exchange server architecture solves the problem of communication between a device such as a media processing system, personal computer, and media peripheral at a first home and a device such as a media processing system, personal computer, and media peripheral located at a second home over the media exchange network 100. The various elements or entities of the media exchange network 100 may comprise one or more storage blocks or locations for storing digital media and data. The storage locations may comprise, for example, hard disk drives, a digital versatile disc (DVD) player, a compact disc (CD) player, disk drives, RAM, or a combination thereof. The storage locations may also include, for example, memory cards, PCM/CIA cards, compact flash cards, or any combination of these. The DVD player and CD player may have read/write capability.

The media peripherals 103, 107 of the media exchange network 100 may include, for example, a digital camera, a digital camcorder, a MP3 player, a home juke-box system, a personal digital assistant and a multi-media gateway device. The media processing systems 102, 106 may be essentially enhanced set-top-boxes although the invention is not so limited. The media processing system 102, 106 may each include a television screen for viewing and interacting with various user interfaces, media, data, and/or services that are available on the media exchange network using, for example, a remote control. The personal computers 101, 105 may comprise desktop personal computers, handheld computers, notebook personal computers, personal computer tablets, personal digital assistants (PDAs), or any other computing device. The personal computers 101, 105 may each include a personal computer monitor for viewing and interacting with various user interfaces, media, data, and/or services that may be available on the media exchange network using, for example, a keyboard and mouse. The media processing systems, personal computers and/or media peripherals may comprise functional software to support interaction with the media exchange servers on the media exchange network 100.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

Figure 1B:
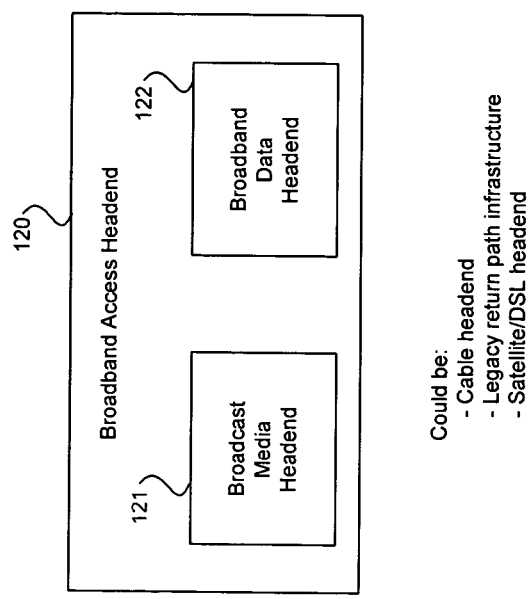
FIG. 1B is a diagram illustrating a general embodiment of a broadband access headend used in the media exchange network of FIG. 1A to support the exchange of media, data, and services between devices on the media exchange network, in accordance with various aspects of the present invention.

FIG. 1B is a diagram illustrating a general embodiment of a broadband access headend 120 used in the media exchange network 100 of FIG. 1A to support the exchange of media, data, and services between devices on the media exchange network 100, in accordance with various aspects of the present invention. The broadband access headend 120 may comprise a broadcast media headend 121 and a broadband data headend 122. The broadcast media headend 121 may be adapted to support the exchange of broadcast media such as analog and digital video and/or audio. The broadband data headend may be adapted to support the exchange of data and control information.

Figure 1C:
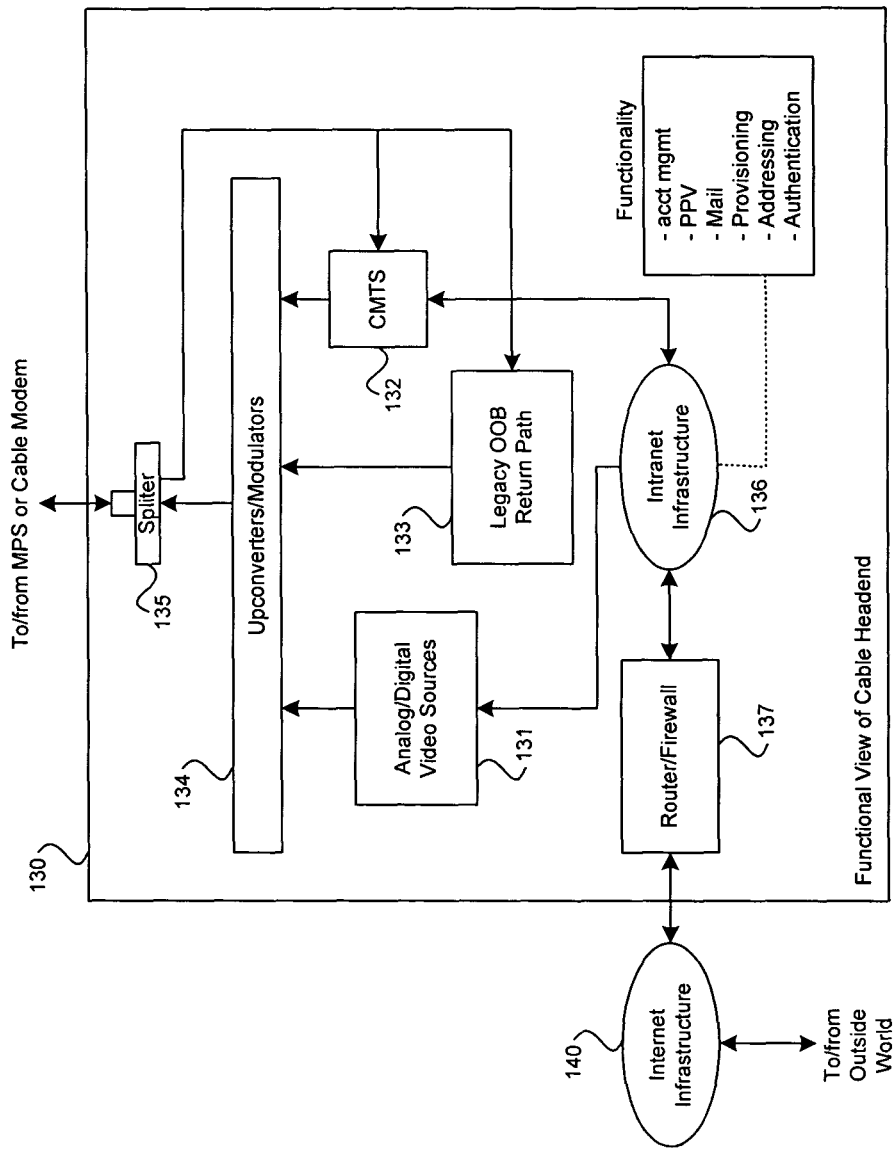
FIG. 1C is a functional diagram illustrating a more specific embodiment of the broadband access headend of FIG. 1B comprising a cable headend, in accordance with various aspects of the present invention.

FIG. 1C is a functional diagram illustrating a more specific embodiment of the broadband access headend 120 of FIG. 1B comprising a cable headend 130, in accordance with various aspects of the present invention. The cable headend 130 may be the primary interface infrastructure between users of a media exchange network, for example, a user at the first ($1^{st}$) home 104 of FIG. 1A and the Internet infrastructures, for example, 115 of FIG. 1A and 140 of FIG. 1C. The cable headend may be managed and/or operated by a cable provider and/or an Internet service provider. The cable headend 130 may comprise analog/video sources 131, a cable modem termination system (CMTS) 132, a legacy out-of-band (OOB) return path 133, upconverters/downconverters 134, a signal splitter 135, an intranet infrastructure 136, and a router/firewall 137.

The analog/digital video sources 131 may include, for example, a disk array, a web cache and/or a video cache. The upconverters/modulators 134 may be adapted to perform channelization of signals from the analog/digital video sources 131, the legacy OOB return path 133, and the cable modem termination system 132. For cable channels, channelization may occur for frequencies between 400-700 MHz. The upconverters/modulators 134 may include, for example, a quadrature amplitude modulated (QAM) modulator and an analog modulator. The signal splitter 135 may handle both digital and analog channels and include a power amplifier.

The cable modem termination system 132 may be a high-end cable modem that supports upstream and downstream communications between the cable headend 130 an multiple users having cable modems and/or media processing systems, televisions, and personal computers that are cable ready. The cable modem termination system 132 may utilize an operating system, for example, a real time operating system (RTOS), embedded operating system or other operating system such as Linux. The intranet infrastructure 136 may comprise a server for handling the flow of digital traffic through the cable headend 130 and to perform various management and control functions within the cable headend 130.

The signal splitter 135 may be adapted to interface to the upconverters/modulators 134, the cable modem termination system 132 and the legacy out-of-band return path 133. The signal splitter 135 may interface with and may pass or transport analog and digital information to a device at a user's home, for example, a cable modem and a media processing system. The analog/digital video sources 131, the legacy OOB return path 133, and the cable modem termination system 132 may interface with the upconverters/modulators 134. The intranet infrastructure 136 may interface with the analog/digital video sources 131, the cable modem termination system 132, and the router/firewall 137. The router/firewall may interface with the Internet infrastructure 140, which is not part of the cable headend 130. The Internet infrastructure 140 interfaces to the outside world, which may include intranets, WANS, MANS and a PSTN.

The functionality of the broadcast media headend 121 in FIG. 1B may be supported by the analog/digital video sources 131, the cable modem termination system 132, and the intranet infrastructure 136 in the cable headend 130 in order to process and pass broadcast media. The analog/digital video sources 131 may be configured to provide support for analog video and/or streaming digital video. For example, a MPEG stream may be generated from a file stored on the analog/digital video sources 131 and passed to the upconverters/modulators 134 to be channelized. Alternatively, the MPEG stream could originate from the Internet infrastructure 140, through the router/firewall 137, to the intranet infrastructure 136, and to the analog/digital video sources 131. The MPEG stream may then be passed or transported to the upconverters/modulators 134 to be channelized.

A digital file may be routed, via the cable modem termination system 132, to the upconverters/modulators 134 for channelization. The digital file may arrive at the cable modem termination system 132 via the Internet infrastructure 140, the router/firewall 137 and/or the intranet infrastructure 136. Also, a digital file may be transported to the cable modem termination system 132 via the signal splitter 135 from a user's home in the form of a modulated signal. The cable modem termination system 132 may then demodulate the signal and pass the resultant digital file out to the Internet infrastructure 140 via the intranet infrastructure 136 and the router/firewall 137.

The intranet infrastructure 136 within the cable headend 130 may be adapted to performs various functions including passing digital information such as digital files, digital streams, digital commands, account management such as billing, pay-per-view processing, email, provisioning, addressing and user authentication, for example, sending a signal via the cable modem termination system to decode video sent to a media processing system. The addressing may be static or dynamic such as in the case of a statically assigned IP address and a dynamically assigned IP address.

The functionality of the broadband data headend 122 in FIG. 1B may be supported by the cable modem termination system 132, the legacy out of band return path 133 and/or the intranet infrastructure 136 in the cable headend 130. Various commands, such as control commands and request commands, may be processed and transported or passed through the cable modem termination system 132. For example, a media processing system at a user's home may send a request to the cable headend 130. The request comes through the splitter 135 to the cable modem termination system 132. The cable modem termination system processes the request, possibly in conjunction with the intranet infrastructure 136. A response to the request may be passed back to the media processing system at the user's home via the cable modem termination system 132, upconverters/modulators 134, and signal splitter 135. The cable modem termination system 132 may be typically configured to communicate with a plurality of users through the signal splitter 135.

The legacy out-of-band return path 133 may be configured to process legacy out-of-band signals that arrive at the cable headend from a user's home. These out-of-band signals are separate from the broadcast channel frequencies, for example, 5-50 MHz signals that may include, for example, per-per-view commands from a user. The legacy out-of-band return path 133 may demodulate and process the out-of-band signals and, in response, may transmit other out-of-band signals back to the user via the upconverters/modulators 134 and the signal splitter 135.

The router/firewall 137 may be adapted to route signals to the correct destinations on the Internet and/or intranet infrastructures and may aid in isolating the cable headend from unwanted accesses via the Internet infrastructure 140. In this regard, isolation may be provided through the use of a firewall.

Figure 1D:
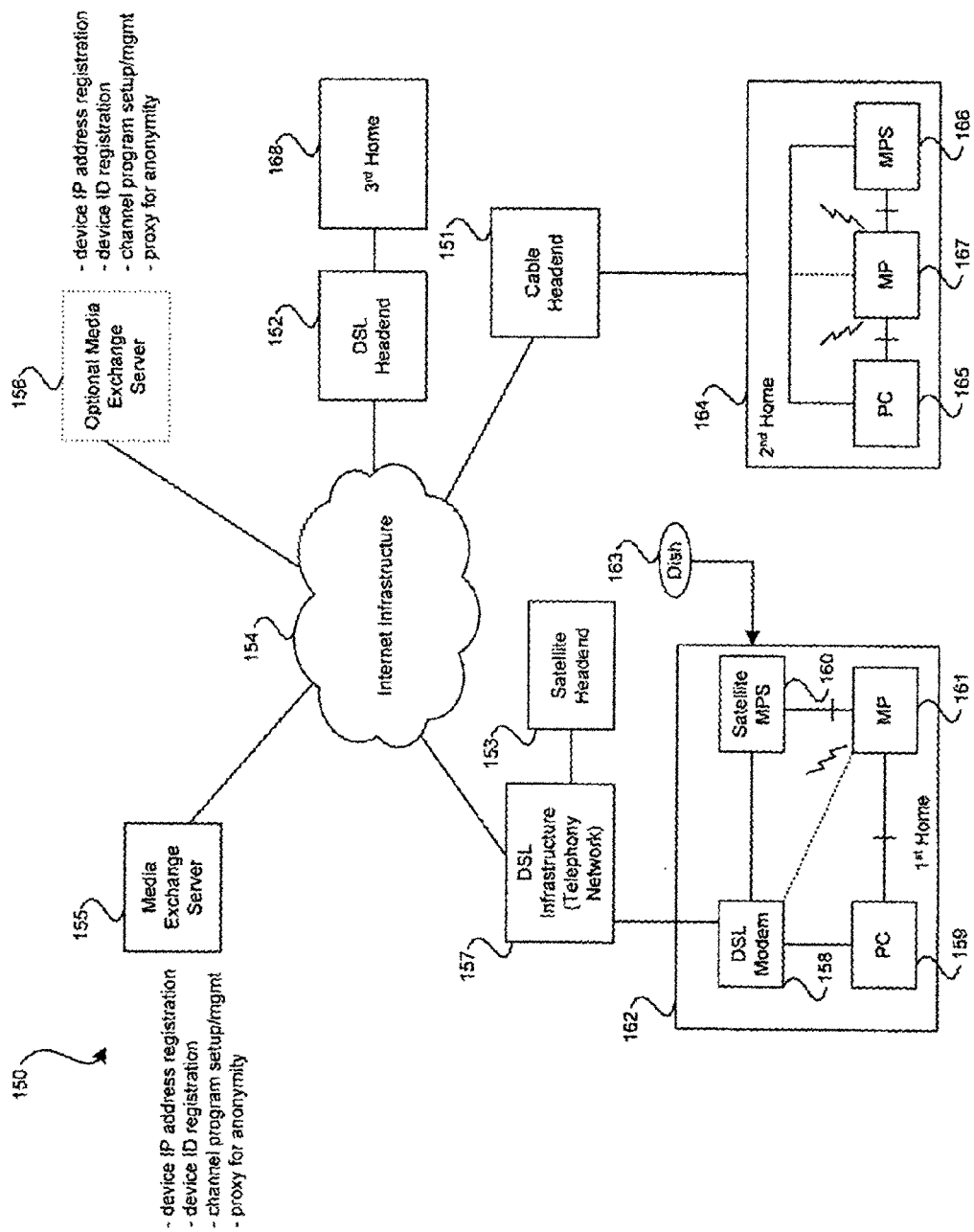
FIG. 1D is a diagram illustrating a more specific embodiment of the media exchange network of FIG. 1A comprising a cable headend, a DSL headend, and a satellite headend, in accordance with various aspects of the present invention.

A broadband access headend in the media exchange network 100 of FIG. 1A may also comprise a digital subscriber line headend or a satellite headend. FIG. 1D is a diagram illustrating a media exchange network 150, which is a more specific embodiment of the media exchange network 100 of FIG. 1A, comprising a cable headend 151, a digital subscriber line headend 152, and a satellite headend 153, in accordance with various aspects of the present invention.

Referring to FIG. 1D, the media exchange network 150 may further comprise an Internet infrastructure 154, a media exchange server 155, at least one optional media exchange server 156, and a digital subscriber line infrastructure 157. Two or more media exchange server such as media exchange server 156 may also be provided to support a multiple server architecture. At a first ($1^{st}$) home 162, the media exchange network 150 also comprises a digital subscriber line modem 158, a personal computer 159, a satellite media processing system 160, a media peripheral 161, and a dish 163. Although the dish 163 is associated with the first (1st) home, it may be mounted externally thereto, as illustrated in FIG. 1D. At a second ($2^{nd}$) home 164, the media exchange network 150 may comprise a personal computer 165, a cable media processing system 166, and a media peripheral 167.

The media exchange server 155, the media exchange server 156, the digital subscriber line headend 152, the digital subscriber line infrastructure 157, and the cable headend 151 each connect to the Internet infrastructure 154. The digital subscriber line headend 152 connects to devices in a third ($3^{rd}$) home 168. The devices located at the third ($3^{rd}$) home 168 may include a personal computer, a digital subscriber line media processing system, a digital subscriber line modem, and a media peripheral that not shown as part of the media exchange network 150.

The digital subscriber line infrastructure 157 which may be part of a telephony network may be coupled or interfaced to the first (1st) home 162 via a digital subscriber line modem 158. The digital subscriber line infrastructure 157 may also be coupled to the Internet infrastructure 154 and the satellite headend 153. The satellite media processing system 160 may interface with the DSL modem 158 and the dish 163. The personal computer 159 may interface to the digital subscriber line modem 158. The media peripheral 161 may interface to the satellite media processing system 160 and/or the personal computer 159 via wireless or wired connections such as a universal serial bus or an IEEEE 1394 Firewire connection. Optionally, the media peripheral 161 may interface to the digital subscriber line modem 158. As a further option, the personal computer 159 and/or the satellite media processing system 160 may internally include a digital subscriber line modem to connect to the digital subscriber line infrastructure instead of utilizing the external digital subscriber line modem 158.

The personal computer 165 and cable media processing system 166 in the $2^{nd}$ home 164 may interface with the cable headend 151. The personal computer 165 and cable media processing system 166 may include a cable modem internally. Optionally, cable modems may be externally coupled to the personal computer 165 and/or cable media processing system 166 to interface with the cable headend 151. The media peripheral 167 may interface with the cable media processing system 166 and/or the personal computer 165 via wireless or wired connections such as a universal serial bus or an IEEE 1394 Firewire connections. Optionally, the media peripheral 167 may interface to the cable headend 151 via a cable modem. A cable infrastructure (not shown) is provided to route cable signals between the cable headend 151 and the $2^{nd}$ home 164 and between the cable headend 151 and the Internet infrastructure 154.

The satellite headend 153 essentially comprises a high-end DSL modem with supporting infrastructure such as upconverters/modulators, router/firewall and intranet infrastructure, and is operated by a satellite provider. The satellite headend 153 may be adapted to perform much of the same functionality as a cable headend. The satellite headend 153 may have the capability to communicate with users or subscribers via the digital subscriber line infrastructure 157 which may comprise a telephony network to transmit information along twisted pair (TP) copper wires. A user at the first ($1^{st}$) home 162 may receive broadcast media transmitted from an orbiting satellite to a terrestrial or land based satellite dish 163. The satellite dish 163 may be adapted to receive and pipe or otherwise communicate the received satellite signal to the satellite media processing system 160. Communicated information, for example, command data, may be transferred between the first ($1^{st}$) home 162 and the satellite headend 153 via the digital subscriber line infrastructure 157.

The digital subscriber line headend 152 essentially comprises a high-end digital subscriber line modem with supporting infrastructure for example, upconverters/modulators, router/firewall and intranet infrastructure, and is operated by a digital subscriber line provider, telephone service provider and/or cable service provider. The digital subscriber line headend 152 performs much of the same functionality as the cable headend previously described. Broadcast media may be provided to the third ($3^{rd}$) home 168 by the digital subscriber line headend 152 via digital subscriber line infrastructure (not shown) between the third ($3^{rd}$) home 168 and digital subscriber line headend 152, and/or between the digital subscriber line headend 152 the Internet infrastructure 154. Command data may also be communicated between the third ($3^{rd}$) home 168 and the digital subscriber line headend 152 in a similar manner.

In an alternative embodiment of the invention, the functionality of the media exchange servers may be distributed throughout the various elements of the media exchange network. For example, referring to FIG. 1D, the functionality of the media exchange server 155 may alternatively be distributed into any combination of devices on the media exchange network 150 including the personal computer 159, the personal computer 165, the satellite media processing system 160, the cable media processing system 166, the satellite headend 153, the cable headend 151, the digital subscriber line headend 152, and/or devices within the third ($3^{rd}$) home 168.

Other embodiments of the present invention may comprise various combinations and/or multiple instantiations of the elements of FIG. 1A and FIG. 1D, in accordance with various aspects of the present invention.

Figure 2:
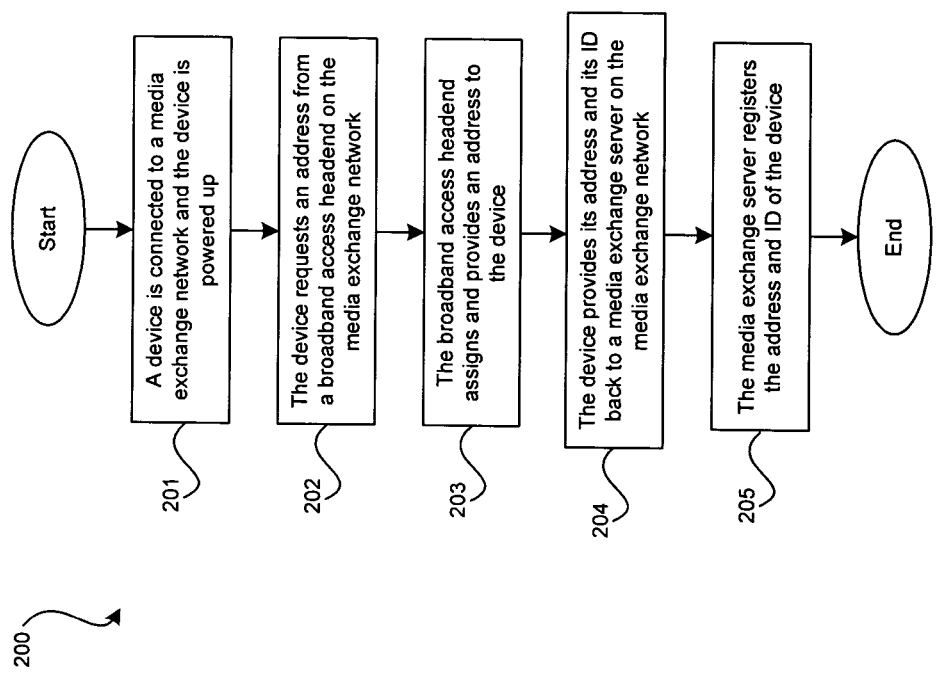
FIG. 2 is a flowchart illustrating an embodiment of a method for registering a device on the media exchange network of FIG. 1A, in accordance with various aspects of the present invention.

FIG. 2 is a flowchart illustrating an embodiment of a method 200 for registering a device on the media exchange network of FIG. 1A, in accordance with various aspects of the present invention. Referring to FIG. 2, in step 201 of the method 200, a device is connected to a media exchange network and is powered up. In step 202, the device may request an address from a broadband access headend on the media exchange network. In step 203, the broadband access headend assigns and provides an address to the device. In step 204, the device provides its address and its identification (ID) to a media exchange server on the media exchange network. In step 205, the media exchange server registers the address and identification (ID) of the device.

In an illustrative embodiment of the invention, with reference to FIG. 1D, a user of the media exchange network 150 at the second ($2^{nd}$) home 164 may connect the cable media processing system 166, which may be referred to as a device, to the media exchange network 150 through the cable infrastructure that interfaces with the cable headend 151 or broadband access headend. Upon power up, the cable media processing system 166 may undergo a registration process with the cable headend 151. Associated with the registration process are the timing and synchronization, ranging, and cable modem provisioning including Internet protocol (IP) address assignment, for example, which may be based on service functionality provided by the cable headend 151 and the type of cable data standard or protocol employed.

Notwithstanding, the intranet infrastructure of FIG. 1C of the cable headend 151 may assign and transmit an IP address to the cable media processing system 166. The address may be a permanent, fixed IP address or may be a temporary IP address provided using dynamic host configuration protocol (DHCP). With DHCP addressing, a server in the intranet infrastructure of the cable headend may be adapted to allocate IP addresses based on which devices are active on the network. The intranet infrastructure may control the IP addressing such that the assigned IP address is transparent to the outside world. In this regard, the server may be adapted to perform a translation of the IP address to the Internet infrastructure.

Next, the cable media processing system 166 may be configured to ping the media exchange server 155 and may transmit its IP address and identification information (ID) to the media exchange server 155 via the cable headend 151 and Internet infrastructure 154. The cable media processing system may include software that may be configured to recognize or identify the IP address of the media exchange server 155 and perform the pinging. The software may be a part of a media exchange software (MES) platform that provides much of the media exchange functionality for the cable media processing system 166 on the media exchange network 150. The identification (ID) may be in the form of, for example, a digital certificate or a serial number that is installed as firmware or hardware in the cable media processing system 166. The cable media processing system 166 may be aware of the IP address of the media exchange server 155 so that it may transmit its IP address and ID to the media exchange server 155.

Accordingly, the media exchange server 155 may register the IP address and ID of the cable media processing system. As a result, the media exchange server 155 may recognize the cable media processing system 166 as a legitimate device on the media exchange network 150. Other users of the media exchange network 150 may be able to communicate with the cable media processing system 166 with the aid of the registered information and functionality of the media exchange server 155. In one embodiment of the invention, one IP address and/or ID of the cable media processing system 166 may be broadcasted to at least selected other networking entities or components on the media exchange network 150.

Other devices connected to the media exchange network 150 may be registered by the media exchange server in a similar manner. Multiple media exchange servers may be present at various strategic locations in the media exchange network and play a part in device registration. In accordance with an embodiment of the invention, the multiple servers may communicate with each other by maintaining a bridge routing table between servers. In this regard, a particular server may have information regarding details of how to communicate with a neighboring server. Also, the functions of the media exchange server may be distributed throughout devices on the media exchange network, such as personal computers and media processing systems in the home or headends, and accomplish the registration of devices.

By registering devices on a media exchange network, the registered devices now have a means to communicate with each other. A registered device on the media exchange network 150 may access a list of other registered devices on the media exchange network 150 from the media exchange server 155. As a result, a registered device may establish a communication link with other registered devices. For example, if the cable media processing system 166 at the second ($2^{nd}$) home and the personal computer 159 at the first ($1^{st}$) home are both registered with the media exchange server 155, then the user of the cable media processing system 166 may access this registered information and utilized the registration information to push or otherwise communicate media to the personal computer 159 over the media exchange network 150. That is, the media exchange server 155 knows the IP addresses of the source and desired destination. Therefore, the media exchange server 155 may coordinate the exchange of media between the two registered devices.

As another example, a user of the personal computer 159 at the first ($1^{st}$) home 162 may desire to push media to the cable media processing system 166 at the second ($2^{nd}$) home 164. The user of the personal computer 159 may know the name and street address of the user of the cable media processing system 166 at the second ($2^{nd}$) home 164 and provide this name to the media exchange server 155. The personal computer 159 may be registered with the media exchange server 155 and the cable media processing system 166 may be registered with the media exchange server 156. As a result, the media exchange server 155 may not have the registration information of the cable media processing system 166 at the second ($2^{nd}$) home 164 since the cable media processing system 166 is registered with the media exchange server 156. In this regard, the media exchange server 155 may have to request and/or query the media exchange server 156, via the Internet infrastructure, about the existence of, for example, registration information, the cable media processing system 166 at the second ($2^{nd}$) home based on the provided user's name and street address. Information about the cable media processing system 166 at the second ($2^{nd}$) home is routed by the media exchange server 156 to the media exchange server 155. The personal computer 159 at the first ($1^{st}$) home may utilize the information about the cable media processing system 166 in the media exchange server 155 to route media to the cable media processing system 166 at the second ($2^{nd}$) home.

Certain other embodiments of the invention may be found in a method for setting up devices for communication on a communication network. Aspects of the method may comprise the steps of detecting when a first device is initially coupled to the communication network and assigning an address to the first device when it is coupled to the communication network. The assigned address may then be transferred to the first device. In response to receiving the transferred assigned address and/or an identifier of the first device from the first device, the received transferred assigned address and/or the identifier of the first device may be communicated to at least one communication server coupled to the communication network. In a multiserver environment, the received transferred assigned address and/or the identifier of the first device may be communicated to a plurality of servers coupled to the communication network. The steps of assigning, transferring, communicating and/or detecting the first device may be achieved by a headend, which may be coupled to the communication network and provides access to the communication network for the first device. The assigned address of the first device may be a static address, a dynamic address and/or an embedded device address such as a media access control (MAC) address. The identifier of the first device may be a digital certificate and/or a serial number.

In accordance with an aspect of the invention, the communication server may register the transferred assigned address and/or the identifier of the first device and broadcast the assigned address and/or the identifier throughout at least a portion of the communication network. The broadcasted transferred assigned address and/or the identifier of the first device may be received by a second device which may be located in that portion of the communication network. The second device may communicate with the first device by utilizing the received transferred assigned address and/or the identifier of the first device that is broadcasted.

The transferred assigned address and/or the identifier of the first device may be received from the server by a second device whenever the second device desires to communicate with the first device via the communication network. In response to the request, the second device may receive the transferred assigned address and/or the identifier of the first device from the server. Accordingly, the second device may transfer media between the second device and the first device utilizing the received assigned address and/or the identifier of the first device. In another aspect of the invention, the transferred assigned address and/or the identifier of the first device may be requested from the server by the second device whenever the second device desires to communicate with the first device via the communication network based on a known location of the first device.

A further embodiment of the invention may provide a system for setting up devices for communication on a communication network. Certain aspects of the system may comprise a headend that may be configured to detect when a first device is initially coupled to the communication network and assign an address to a first device coupled to the communication network. The headend may be adapted to transfer the assigned address to the first device and in response to receiving the transferred assigned address and/or an identifier of the first device from the first device, the headend may communicate the transferred received assigned address and/or the identifier of the first device to at least one communication server coupled to the communication network. The assigned address of the first device may be a static address, a dynamic address and/or an embedded device address such as a MAC address. The identifier of the first device may be a digital certificate and/or a serial number. The communication server may register the transferred assigned address and/or the identifier of the first device and may broadcast the transferred assigned address and/or the identifier of the first device throughout at least a portion of the communication network.

The system may further comprise a second device located in a portion of the communication network that may receive the broadcasted transferred assigned address and/or the identifier of the first device. The second device may communicate with the first device utilizing the received broadcasted transferred assigned address and/or the identifier of the first device. The second device may also be configured to request the transferred assigned address and/or the identifier of the first device from the server whenever the second device desires to communicate with the first device via the communication network. In response to the request, the second device may receive the transferred assigned address and/or the identifier of the first device from the server and accordingly transfer media between the second device and the first device utilizing the received a transferred assigned address and/or the identifier of the first device. In another aspect of the invention, the second device may requests the transferred assigned address and/or the identifier of the first device from the server whenever the second device desires to communicate with the first device via the communication network based on a known location of the first device.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
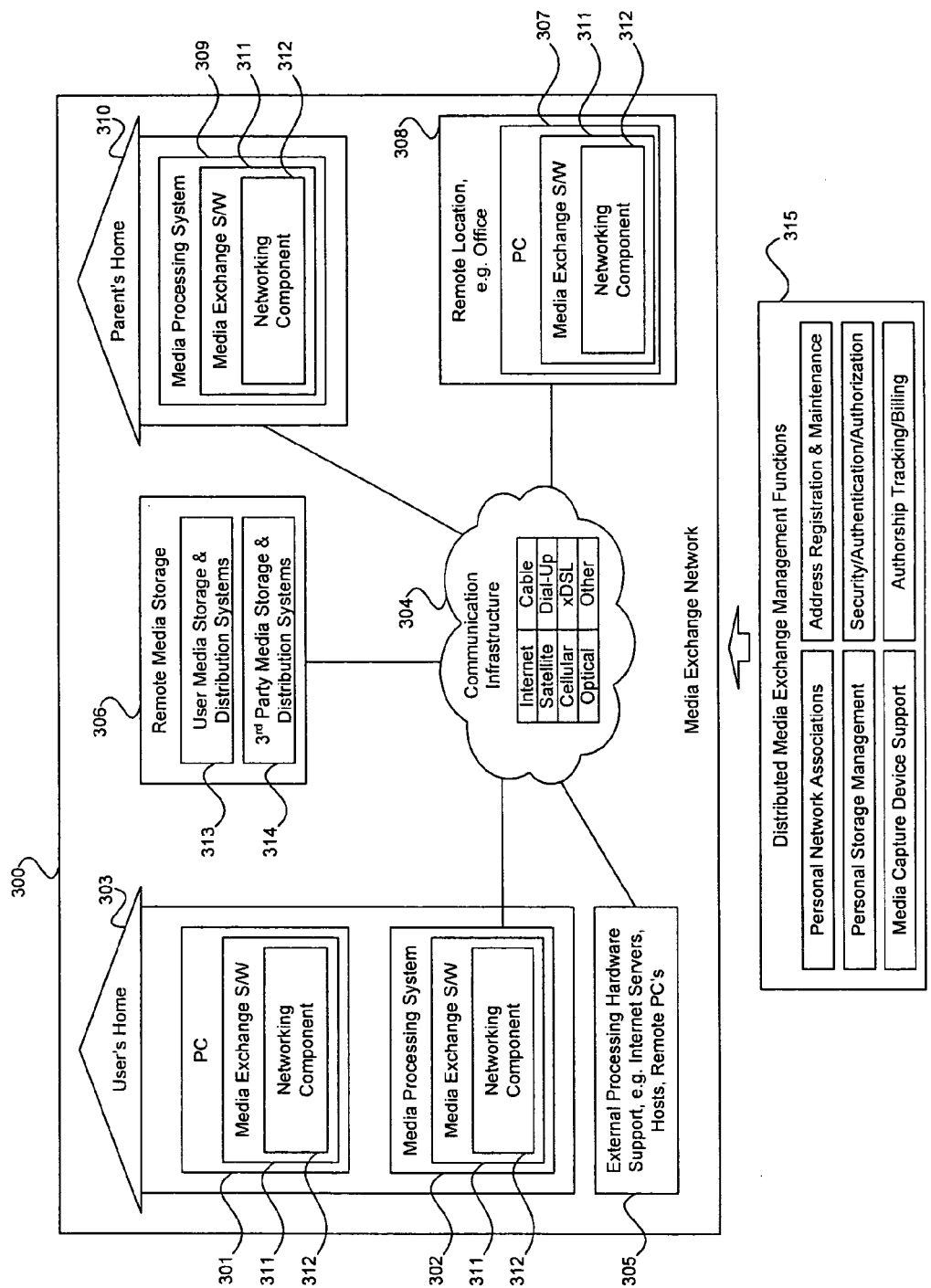
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
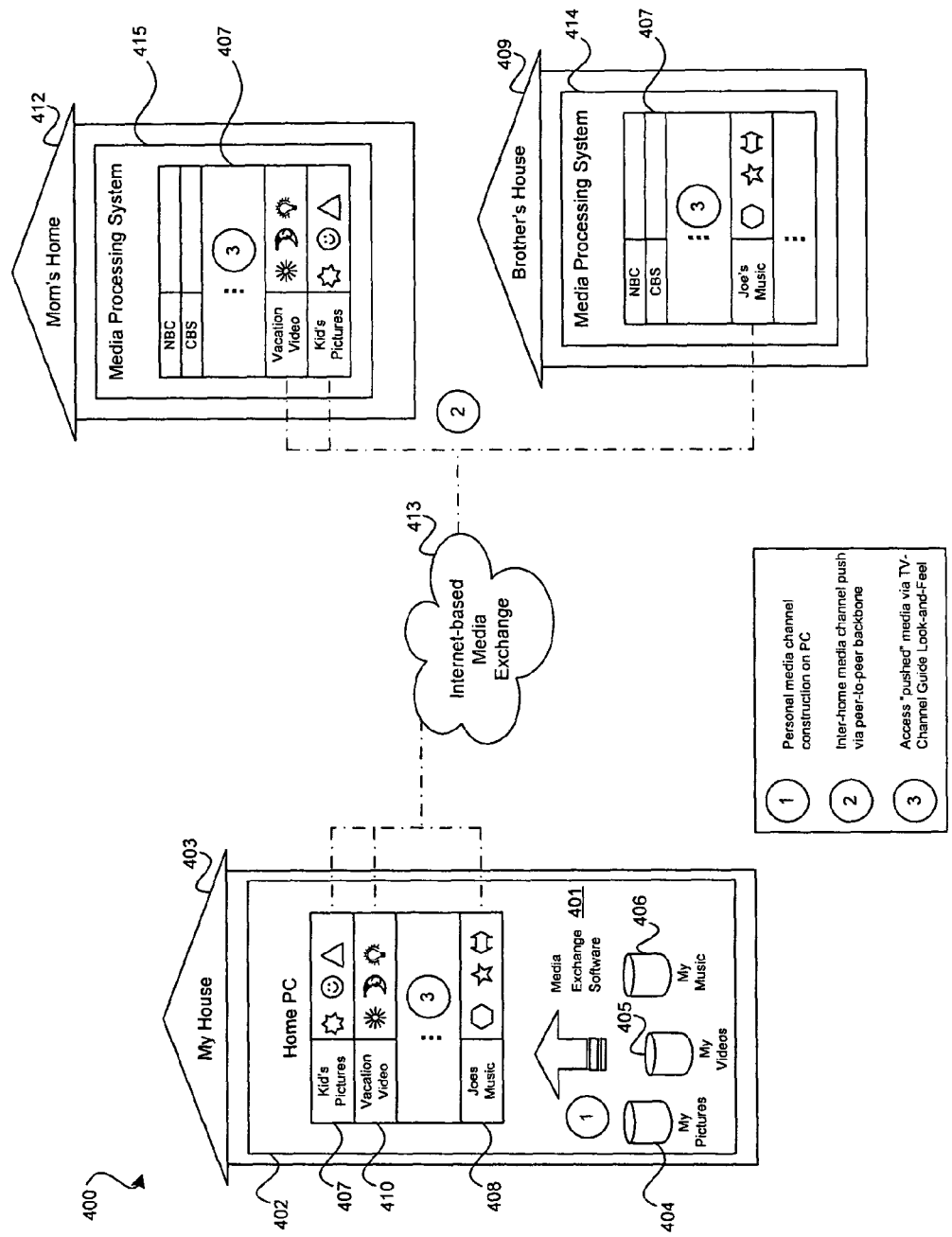
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
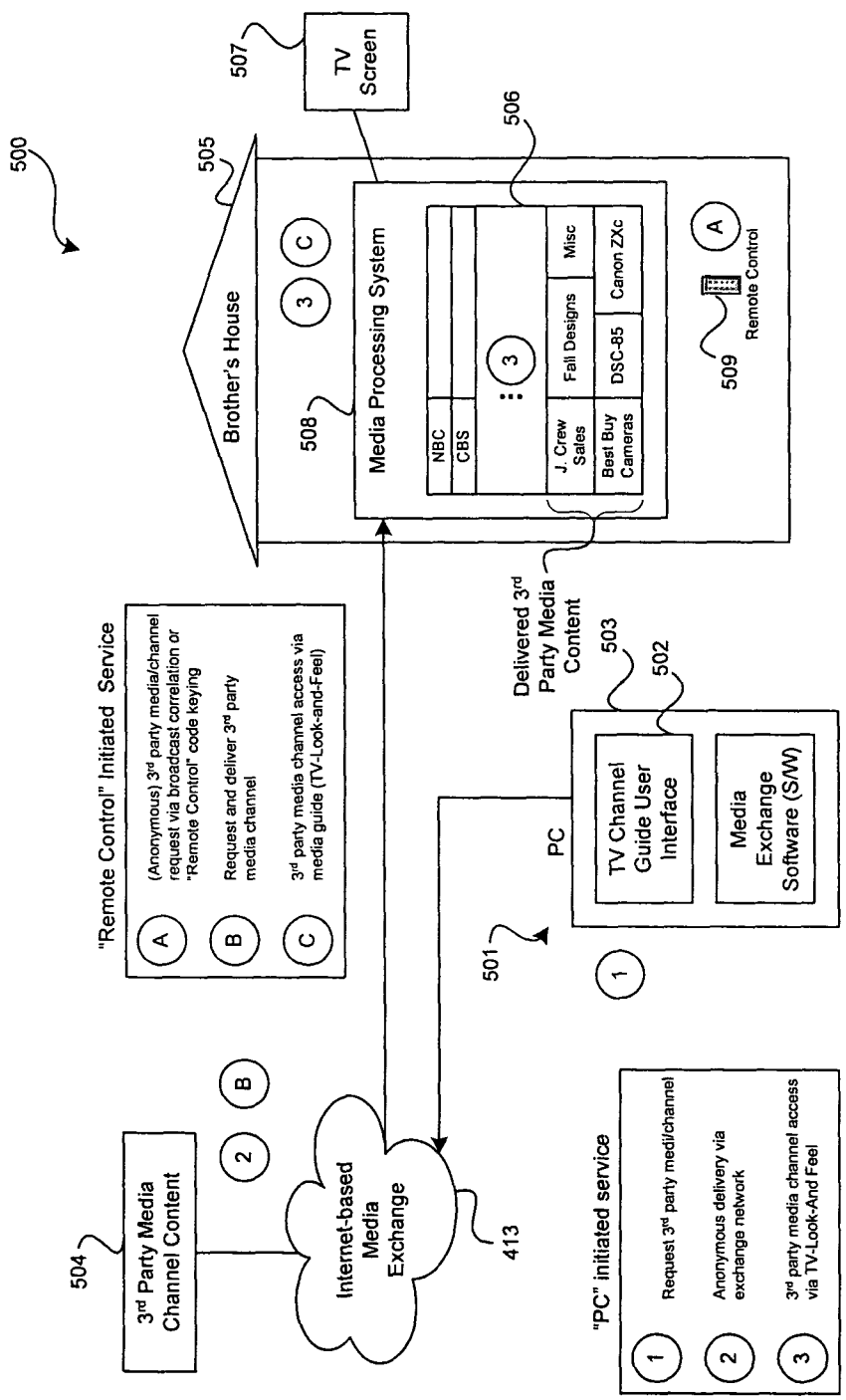
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
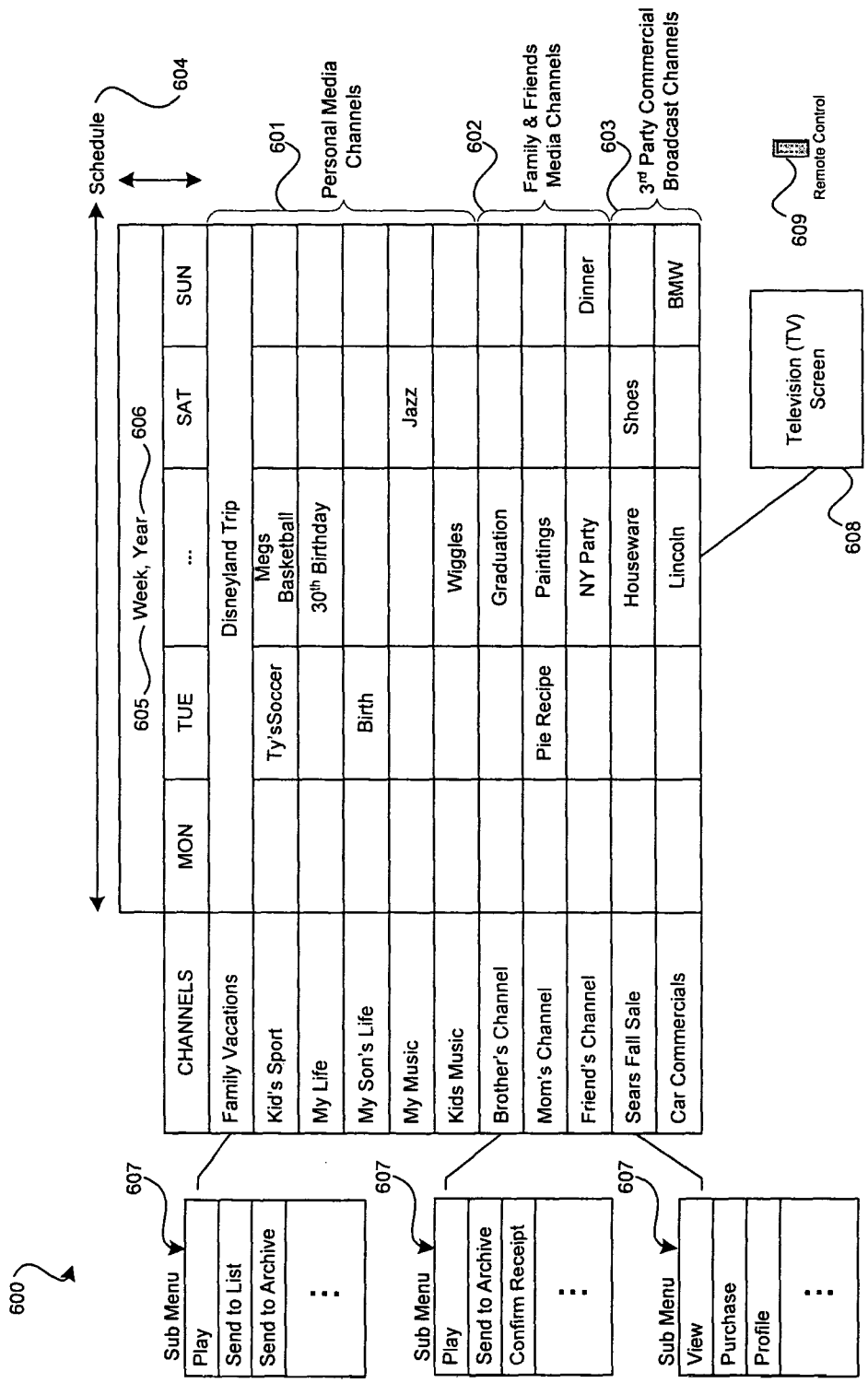
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609.

Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
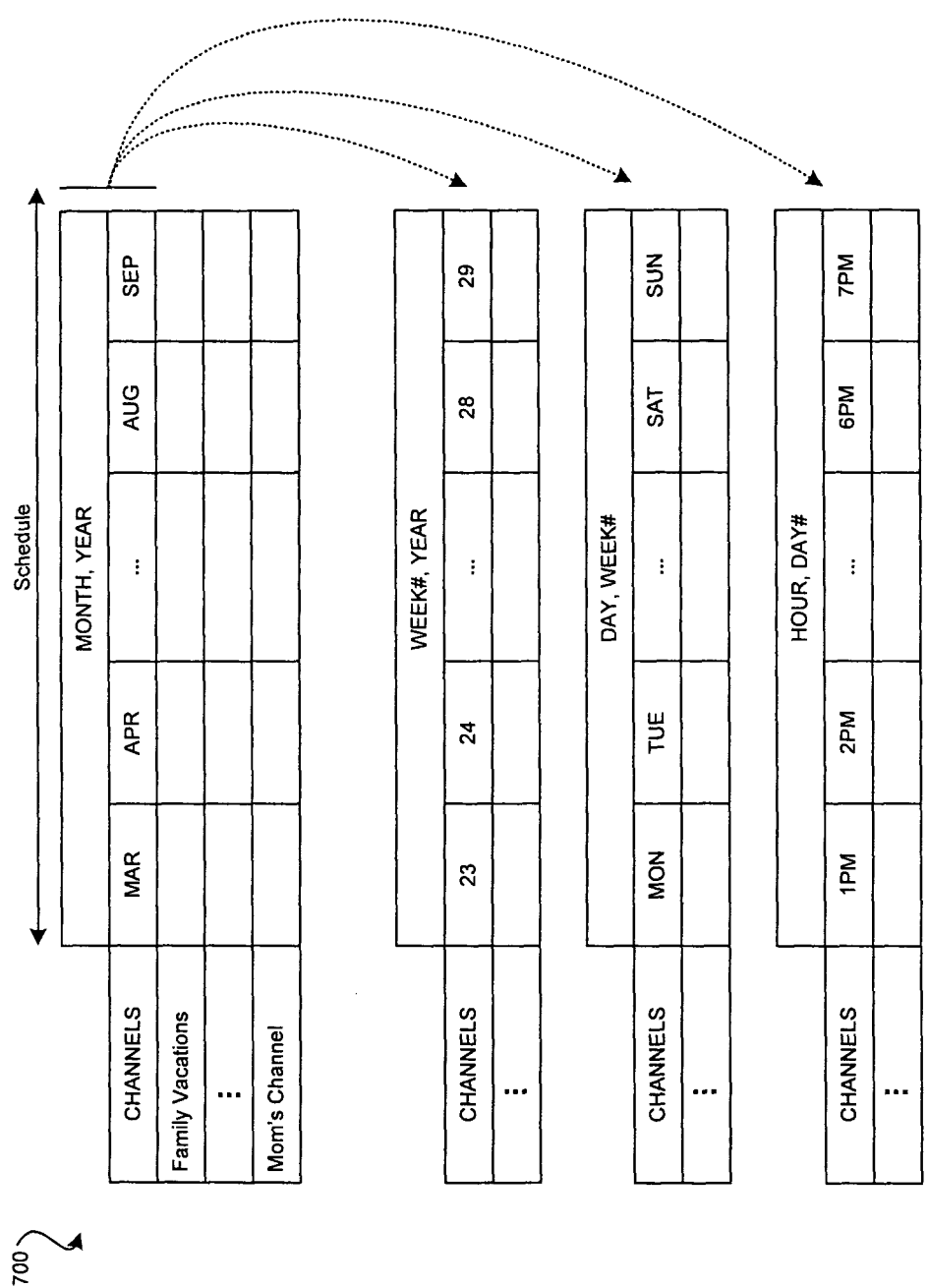
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
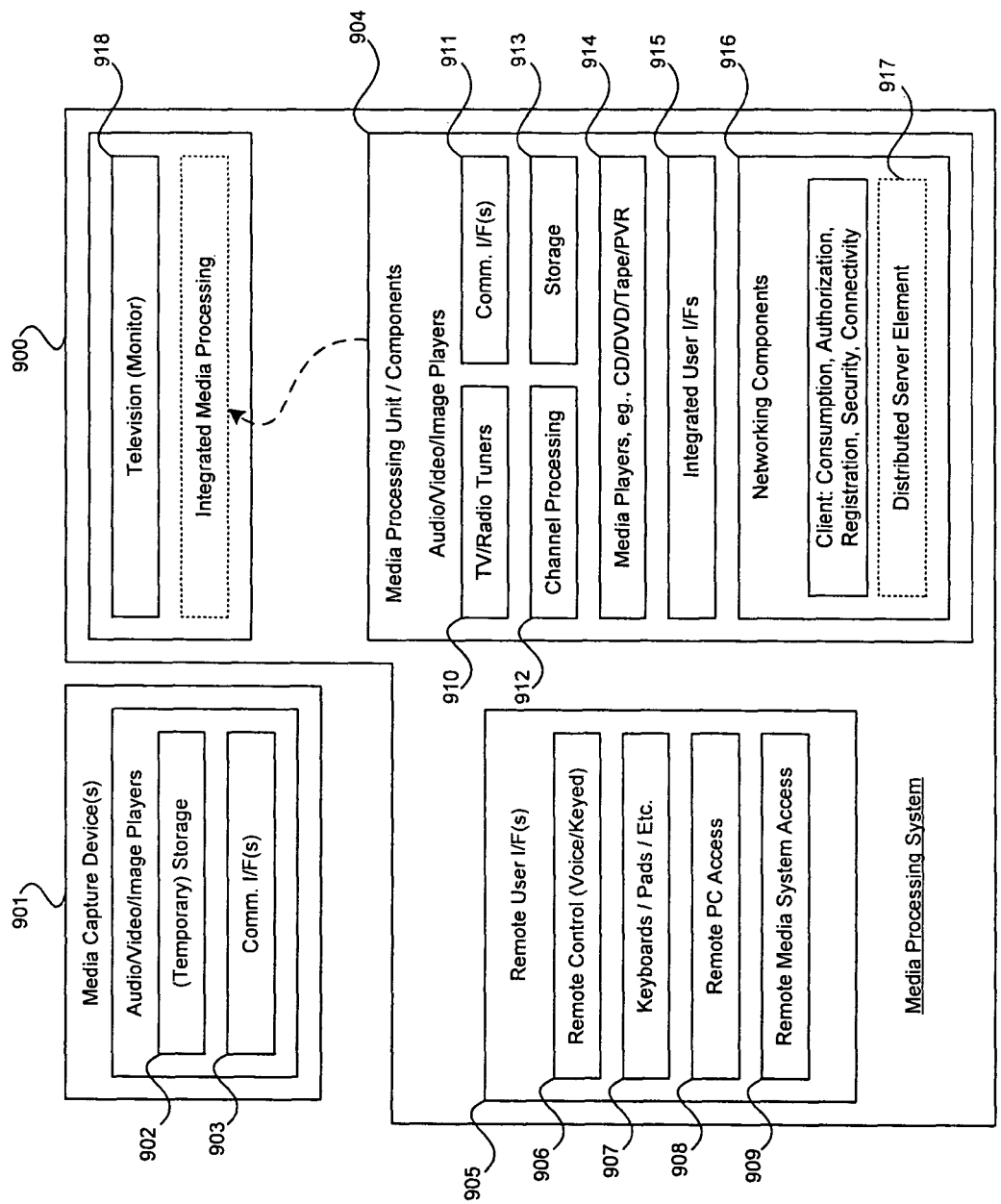
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
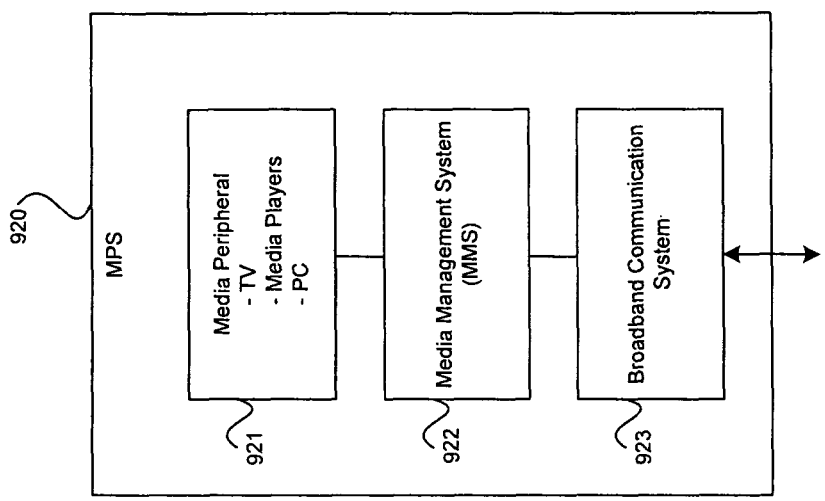
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
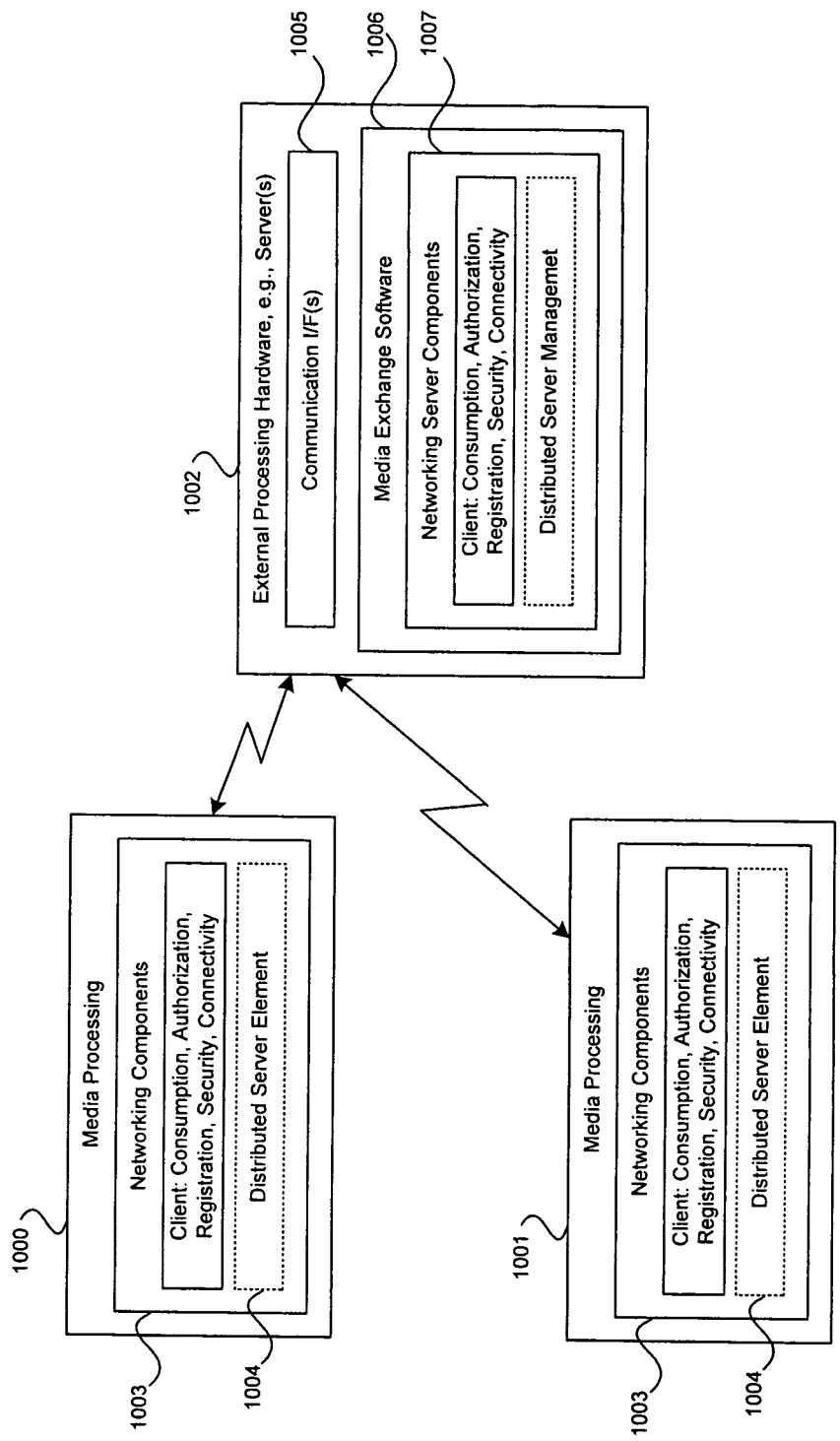
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
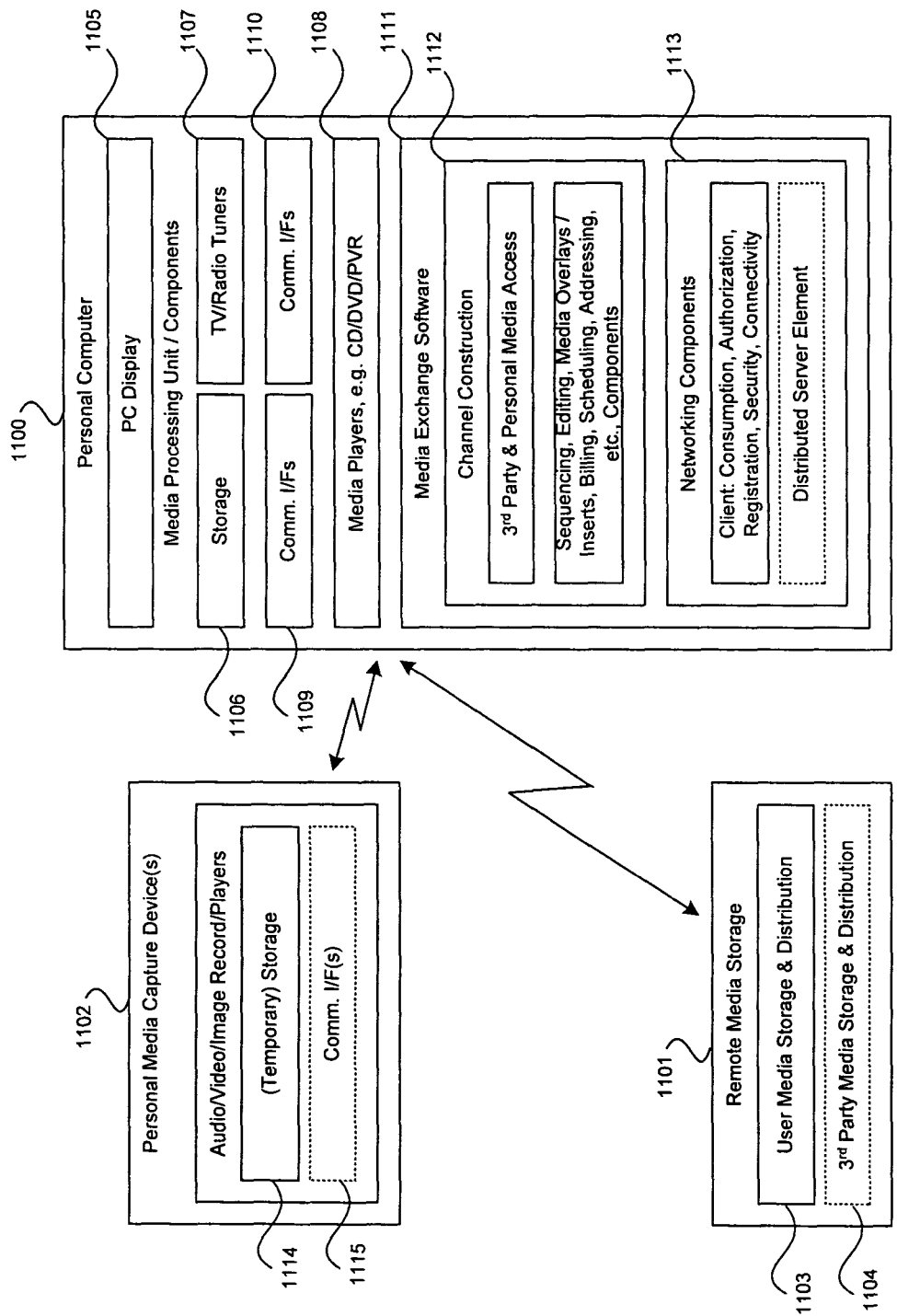
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for setting up devices for communication, the method comprising:

in a communication network comprising a headend, wherein said headend enables access to said communication network for at least a first device, assigning, by said headend, an address to said first device coupled to said communication network, wherein said address is associated with said first device in said communication network at a time of said assigning;

transferring, by said headend, said assigned address to said first device; and in response to said headend receiving an identifier of said first device from said first device, communicating, by said headend, one or both of said transferred assigned address and/or said identifier of said first device to at least one communication server coupled to said communication network.

2. The method according to claim 1, comprising detecting, by said headend, when said first device is initially coupled to said communication network prior to said assigning of said address to said first device.

3. The method according to claim 2, wherein:

said assigned address of said first device is one of a static address, a dynamic address, or an embedded device address; and said identifier of said first device is one of a digital certificate and a serial number.

4. The method according to claim 1, wherein said one or both of said transferred assigned address and/or said identifier of said first device is registered with said at least one communication server.

5. The method according to claim 1, comprising broadcasting said one or both of said transferred assigned address and/or said identifier of said first device throughout at least a portion of said communication network by said at least one communication server.

6. The method according to claim 5, comprising receiving said broadcasted one or both of said transferred assigned address and/or said identifier of said first device by a second device located in said at least a portion of said communication network.

7. The method according to claim 6, wherein said first device communicates with said second device utilizing said received broadcasted one or both of said transferred assigned address and/or said identifier of said first device.

8. The method according to claim 1, wherein a second device desiring to communicate with said first device via said communication network requests said one or both of said transferred assigned address and/or said identifier of said first device from said communication server.

9. The method according to claim 8, wherein:

in response to said request, said second device receives said one or both of said transferred assigned address and/or said identifier of said first device from said communication server; and said second device transfers media between said second device and said first device utilizing said received one or both of said transferred assigned address and/or said identifier of said first device.

10. The method according to claim 8, wherein said second device requests said one or both of said transferred assigned address and/or said identifier of said first device from said communication server based on a known location of said first device.

11. A machine-readable storage having stored thereon, a computer program having at least one code section for setting up devices for communication, the at least one code section being executable by a machine for causing the machine to perform steps comprising:
  in a communication network comprising a headend, wherein said headend enables access to said communication network for at least a first device,
  assigning, by said headend, an address to said first device coupled to said communication network, wherein said address is associated with said first device in said communication network at a time of said assigning;
  transferring, by said headend, said assigned address to said first device; and
  in response to said headend receiving an identifier of said first device from said first device, communicating, by said headend, one or both of said transferred assigned address and/or said identifier of said first device to at least one communication server coupled to said communication network.

12. The machine-readable storage according to claim 11, wherein said at least one code section comprises code for detecting, by said headend, when said first device is initially coupled to said communication network prior to said assigning of said address to said first device.

13. The machine-readable storage according to claim 12, wherein:
  said assigned address of said first device is one of a static address, a dynamic address, or an embedded device address;
  said identifier of said first device is one of a digital certificate and a serial number.

14. The machine-readable storage according to claim 11, wherein said one or both of said transferred assigned address and/or said identifier of said first device is registered with said at least one communication server.

15. The machine-readable storage according to claim 11, wherein said at least one code section comprises code for broadcasting said one or both of said transferred assigned address and/or said identifier of said first device throughout at least a portion of said communication network by said at least one communication server.

16. The machine-readable storage according to claim 15, wherein said at least one code section comprises code for receiving said broadcasted one or both of said transferred assigned address and/or said identifier of said first device by a second device located in said at least a portion of said communication network.

17. The machine-readable storage according to claim 16, wherein said first device communicates with said second device utilizing said received broadcasted one or both of said transferred assigned address and/or said identifier of said first device.

18. The machine-readable storage according to claim 11, wherein a second device desiring to communicate with said first device via said communication network requests said one or both of said transferred assigned address and/or said identifier of said first device from said communication server.

19. The machine-readable storage according to claim 18, wherein:
  in response to said request, said second device receives said one or both of said transferred assigned address and/or said identifier of said first device from said communication server; and
  said second device transfers media between said second device and said first device utilizing said received one or both of said transferred assigned address and said identifier of said first device.

20. The machine-readable storage according to claim 18, wherein said second device requests said one or both of said transferred assigned address and/or said identifier of said first device from said communication server based on a known location of said first device.

21. A system for setting up devices for communication, the system comprising:
  one or more circuits for use in a headend communicatively coupled to a communication network, said one or more circuits operable to:
  assign an address to a first device coupled to the communication network, wherein said address is associated with said first device in said communication network at a time of said assigning;
  transfer said assigned address to said first device; and
  in response to receiving an identifier of said first device from said first device, communicate one or both of said transferred assigned address and/or said identifier of said first device to at least one communication server coupled to the said communication network.

22. The system according to claim 21, wherein said one or more circuits are operable to detect when said first device is initially coupled to said communication network prior to said assigning of said address to said first device.

23. The system according to claim 22, wherein:
  said assigned address of said first device is one of a static address, a dynamic address, or an embedded device address; and
  said identifier of said first device is one of a digital certificate and a serial number.

24. The system according to claim 21, wherein said communication server registers said one or both of said transferred assigned address and/or said identifier of said first device.

25. The system according to claim 21, wherein said communication server broadcasts said one or both of said transferred assigned address and/or said identifier of said first device throughout at least a portion of said communication network.

26. The system according to claim 25, wherein a second device located in said at least a portion of the communication network receives said broadcasted one or both of said transferred assigned address and/or said identifier of said first device.

27. The system according to claim 26, wherein said second device communicates with said first device utilizing said received broadcasted one or both of said transferred assigned address and/or said identifier of said first device.

28. The system according to claim 21, wherein a second device requests said one or both of said transferred assigned address and/or said identifier of said first device from said communication server whenever said second device desires to communicate with said first device via said communication network.

29. The system according to claim 28, wherein, in response to said request, said second device:
  receives said at least one of said transferred assigned address and said identifier of said first device from said communication server; and
  transfers media between said second device and said first device utilizing said received one or both of said transferred assigned address and/or said identifier of said first device.

30. The system according to claim 28, wherein said second device requests said one or both of said transferred assigned address and/or said identifier of said first device from said communication server based on a known location of said first device.

\* \* \* \* \*